United States Patent [19]
Gilbreath et al.

[11] 3,792,246
[45] Feb. 12, 1974

[54] VECTOR ANGLE COMPUTER
[75] Inventors: Dennis R. Gilbreath, Seymour, Conn.; Sheldon D. Kralstein, Forest Hills, N.Y.
[73] Assignee: United Aircraft Corporation, East Hartford, Conn.
[22] Filed: Nov. 10, 1972
[21] Appl. No.: 305,635

[52] U.S. Cl............. 235/186, 235/150.26, 235/197, 328/145
[51] Int. Cl. ........ G06g 7/22, G06g 7/26, G06g 7/78
[58] Field of Search 235/186, 189, 193, 197, 150.26, 235/150.27; 328/145

[56] References Cited
UNITED STATES PATENTS

| | | | |
|---|---|---|---|
| 3,496,565 | 2/1970 | Jenkins | 235/186 X |
| 3,534,399 | 10/1970 | Hirsch | 235/186 X |
| 3,662,162 | 5/1972 | Kallio | 235/186 |
| 3,676,660 | 7/1972 | Miller | 235/186 |

*Primary Examiner*—Joseph F. Ruggiero
*Attorney, Agent, or Firm*—Melvin Pearson Williams

[57] ABSTRACT

An output voltage proportional to the angle of a vector is provided by apparatus including a logarithmic function generator. The output voltage is proportional to the difference between the logarithm of one of two orthogonal components of the vector and the logarithm of the sum of the components. A nonlinear network may be used for providing a correction signal to correct a known deviation of the output voltage. A calibration voltage is periodically applied to the input of the function generator which, in response thereto, provides an error voltage which is fed to an integrator which drives a heater included as an integral part of the function generator, resulting in changes of the temperature of the function generator to change its transfer characteristics in a manner tending to reduce the error voltage to zero.

6 Claims, 7 Drawing Figures

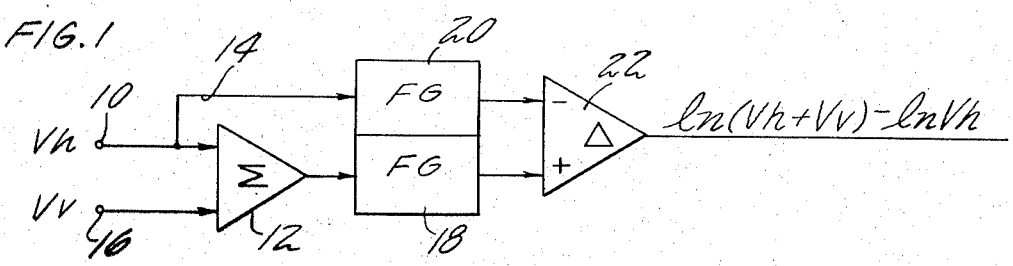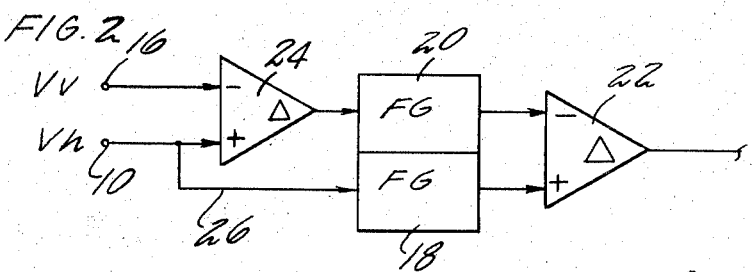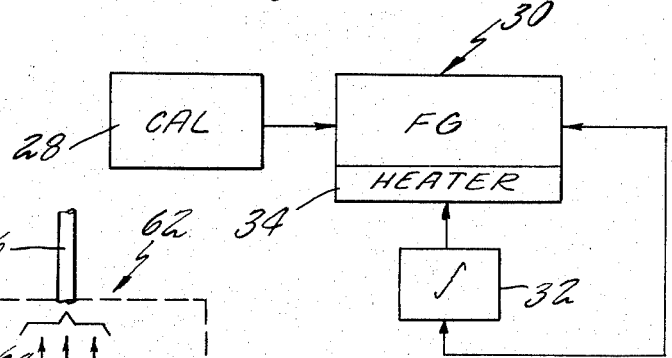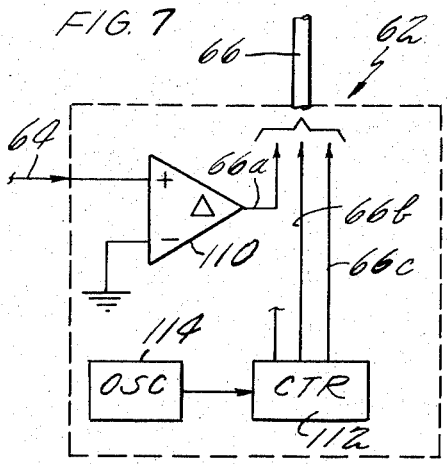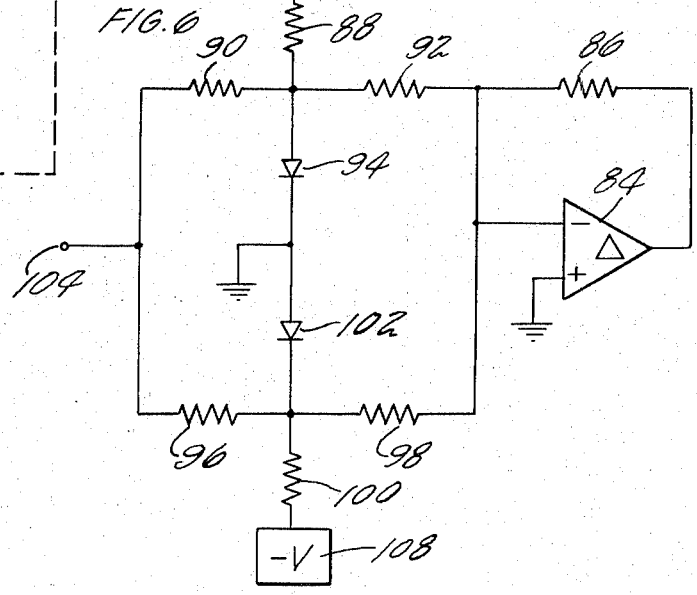

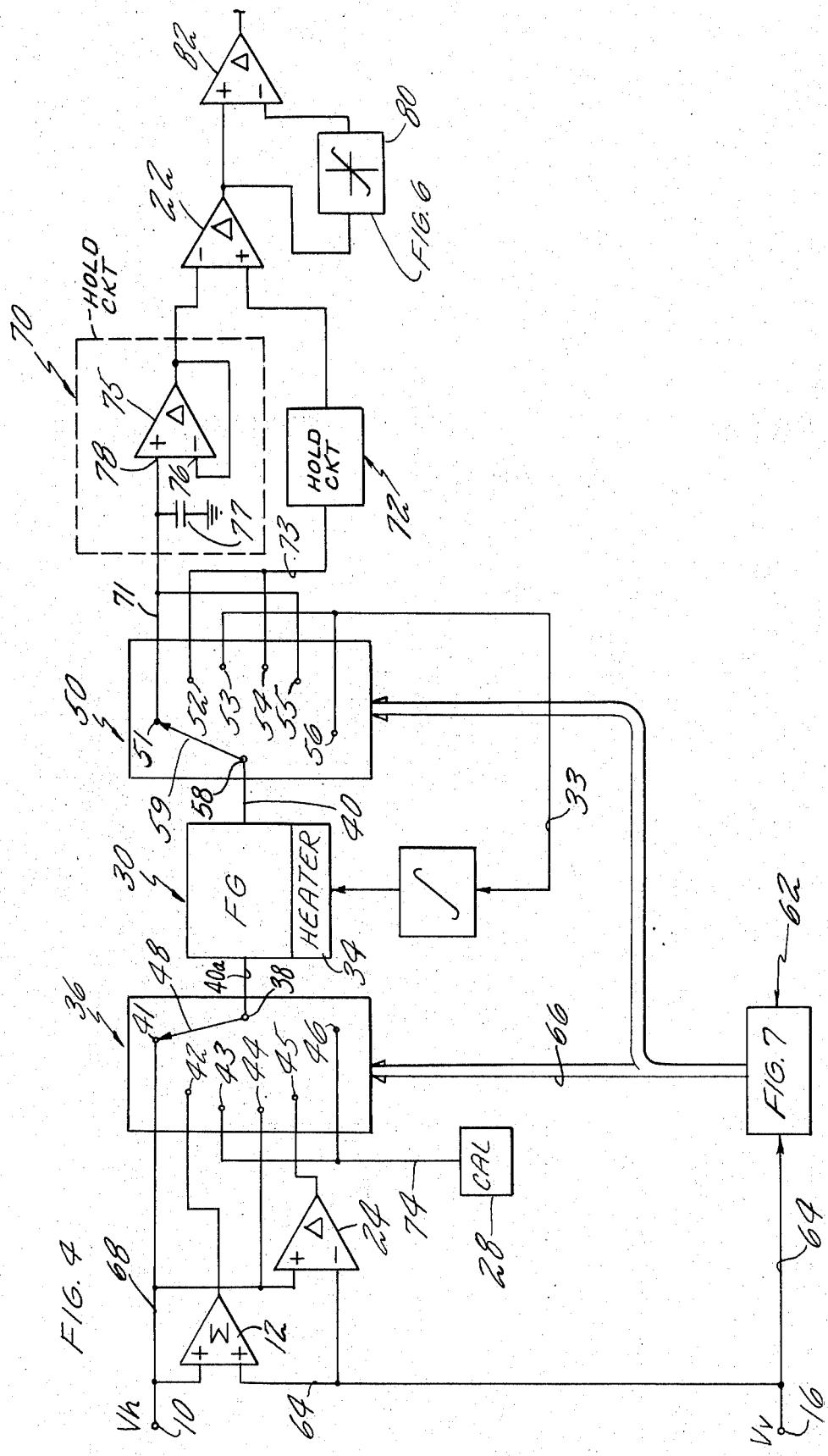

VECTOR ANGLE COMPUTER

BACKGROUND OF THE INVENTION

1. Field of Invention

This invention relates to signal processing and more particularly to apparatus for providing a signal proportional to the angle of a vector.

2. Description of the Prior Art

In an aircraft it may be desirable to provide a signal proportional to the angle (with respect to a horizontal plane) of the velocity of the aircraft, especially when flying at low altitudes and high ground speeds. Apparatus, such as accelerometers, provide acceleration signals from which signals proportional to the respective orthogonal components of the aircraft's velocity may be derived. Using the well-known laws of trigonometry to compute a vector's angle from the orthogonal components thereof requires the division of one component by the other and thereafter finding the arc tangent of the resulting quotient. Therefore, two nonlinear operations (the division and the finding of the arc tangent) must be performed to determine the angle. Apparatus for performing a nonlinear operation is difficult to construct and may introduce substantial inaccuracy. Therefore, it is desired that the number of nonlinear operations be kept to a minimum in computing the angle.

SUMMARY OF THE INVENTION

An object of the present invention is to provide improved apparatus for computing the angle of a vector.

Another object of the present invention is to provide apparatus for computing the angle of a vector with a minumum of nonlinear operations.

According to the present invention, apparatus, including a logarithmic function generator, is responsive to a pair of signals respectively proportional to first and second orthogonal components of a vector and provides an output signal proportional to the difference of the logarithm of the sum of the absolute values of the first and second components and the logarithm of the absolute value of the second component; th output signal may be applied to a nonlinear network which provides a correction signal; the output signal and the correction signal may then be applied to the respective inputs of a difference amplifier which provides a corrected output signal in response thereto.

In one specific embodiment of the present invention where a logarithmic function generator has a temperature-dependent transfer characteristic, a calibration signal is periodically applied to the function generator, the responsive output therefrom being applied to an integrator which drives a heater which heats the function generator thereby changing its transfer characteristics in a manner tending to cause a calibration response output of zero.

The present invention utilizes a single nonlinear device and thermal feedback for providing a voltage substantially proportional to the angle of a vector.

Other objects, features and advantages of the present invention will become more apparent in the light of the following detailed description of a preferred embodiment thereof as illustrated in the accompanying drawing.

BRIEF DESCRIPTION OF THE DRAWING

FIG. 1 is a schematic block diagram of a circuit for determining the angle of a vector having an upward component;

FIG. 2 is a schematic block diagram of a circuit for determining the angle of a vector having a downward component;

FIG. 3 is a schematic block diagram of a circuit for calibrating a logarithmic function generator;

FIG. 4 is a schematic block diagram of a preferred embodiment of the present invention;

FIG. 6 is a schematic diagram of a nonlinear network for use in the embodiment of FIG. 4; and FIG. 7 is a schematic block diagram of multiplex control logic for use in the embodiment of FIG. 4.

DESCRIPTION OF THE PREFERRED EMBODIMENT

Figure 5:
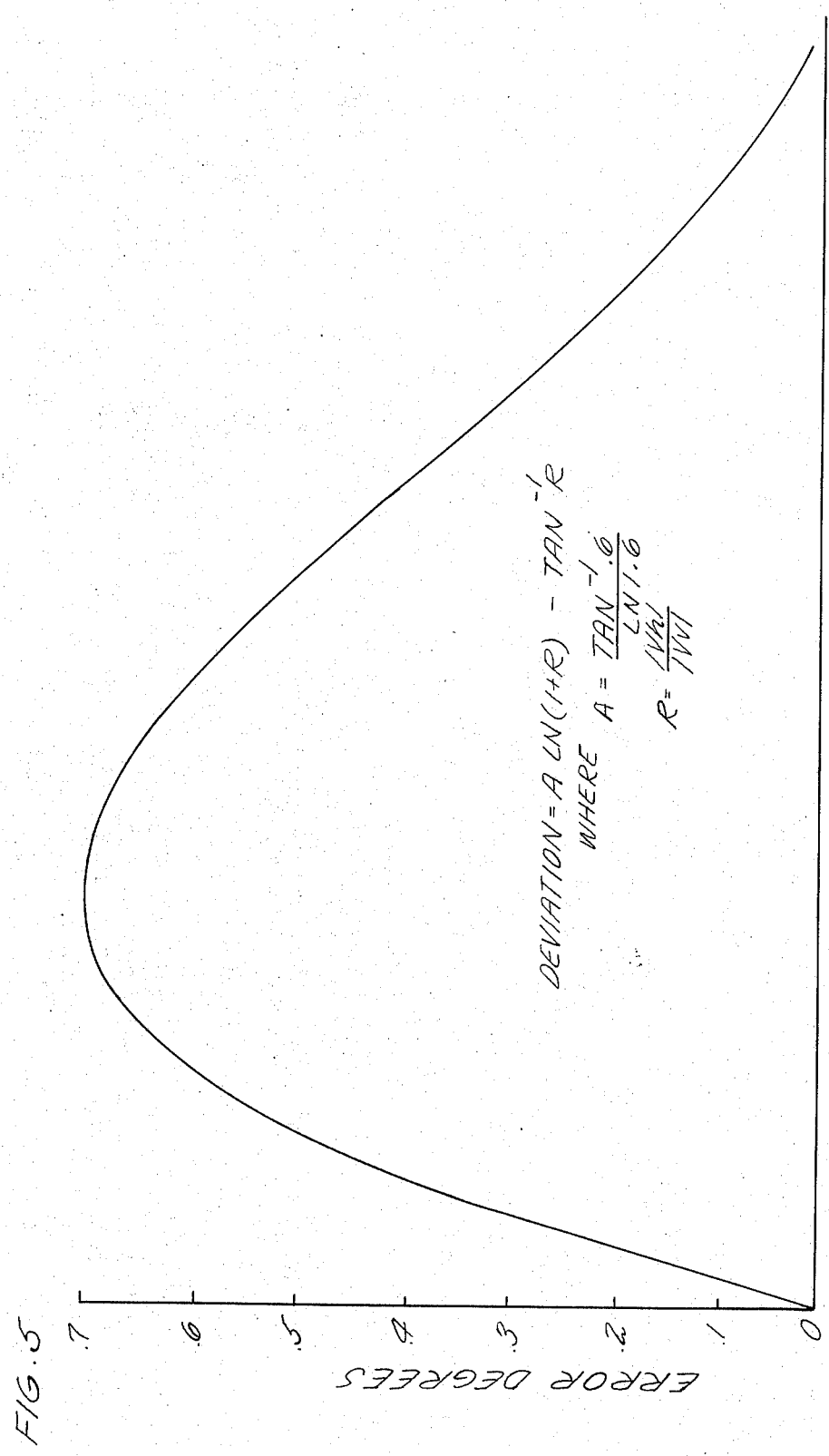
FIG. 5 is a curve of a deviation of the angle of a vector determined from the transformation relationship from the actual angle of the vector.

In the preferred embodiment of the present invention, voltages proportional to two orthogonal components of a vector, such as the horizontal component and the vertical component of the velocity of an aircraft, are provided as an input. In response thereto, there is provided an output voltage proportional to the angle of the vector.

The present invention is predicated upon a heretofore unknown relationship (referred to hereinafter as a transformation relationship) between the orthogonal components and the angle of a vector. The transformation relationship is applicable to vectors having a (sign) horizontal component and provides angles which deviate only slightly from the actual angle where the actual angle is less than 30°. The transformation relationship is given as:

$$\theta = K \ln Vh + |Vv|/Vh = K [\ln(Vh + Vv) - \ln Vh]$$

where $\theta$ is the angle of the vector;

$Vv$ is the amplitude of the vertical component of the velocity vector;

$Vh$ is the horizontal component of the velocity vector;

and $K$ is a constant.

Since only the absolute value of $Vv$ is included in the transformation relationship, the sign of $Vv$ (positive being associated with an upward component) is the same as the sign of the angle, thereby associating any upward component with a positive angle and any downward component with a negative angle.

In a circuit for determining the angle of a vector having an upward component, a voltage proportional to the sum of the horizontal and vertical components provides the term $(Vh + |Vv|)$, the logarithm thereof being one of the terms of the transformation relationship. Referring now to FIG. 1, a voltage proportional to the horizontal component is provided at a terminal 10 which is connected to one input of a summing amplifier 12 through a signal line 14. A voltage proportional to the vertical component is provided at a terminal 16 which is connected to the other input of the amplifier 12. The amplifier 12 provides a voltage proportional to the sum of the voltages applied at the terminals 10, 16. Since the vertical component has a positive sign, the voltage provided by the amplifier 12 is proportional to the term ($Vh + |Vv|$). A voltage proportional to the logarithm of an applied input voltage is provided by a logarithmic function generator 18 (FG) which has its input connected to the output of the amplifier 12. The voltage provided by the function generator 18 is therefore proportional to the term, $\ln(Vh + Vv)$. A logarithmic function generator 20, similar to the function generator 18, has its input connected to the terminal 10 through the line 14. The function generator 20 therefore provides a voltage proportional to the term $\ln Vh$ which is the other term in the transformation relationship. The outputs of the function generators 18, 20 are respectively connected to the positive and negative inputs of a difference amplifier 22 which provides a voltage proportional to a difference given as $\ln(Vh + |Vv|) - \ln Vh$. Since $\ln(Vh + |Vv|)$ is always greater than $\ln Vh$, the voltage provided by the amplifier 22 is always positive, thereby being indicative of the vector having a positive angle. The amplifier 22 therefore provides a voltage proportional to the angle of the vector (having an upward component) in accordance with the transformation relationship.

In a circuit for determining the angle of a vector having a downward component the term ($Vh + |Vv|$), is determined by providing a voltage proportional to ($Vh - Vv$). Because the downward component of the vector has a negative sign associated therewith, $\ln(Vh - Vv)$ is equal to $\ln(Vh + |Vv|)$. Referring now to FIG. 2, the terminal 10 is connected to the positive input of a differential amplifier 24 and to the input of the function generator 18 through a signal line 26. The terminal 16 is connected to the negative input of the amplifier 24. The outputs of the function generators 18, 20 respectively provide the terms $\ln Vh$ and $\ln(Vh + |Vv|)$ of the transformation relationship. The differential amplifier 22 has the positive and negative inputs thereof respectively connected to the outputs of the function generators 18, 20 to provide a voltage proportional to a difference given as $\ln Vh - \ln(Vh + |Vv|)$. Since $\ln(Vh + |Vv|)$ is always greater than $\ln Vh$, the voltage provided by the amplifier 22 is always negative, thereby being indicative of a vector having a negative angle. The amplifier 22 therefore provides a voltage proportional to the angle of a vector (having a downward component) in accordance with the transformation relationship.

Thus there has been shown two circuits which respectively provide voltages proportional to vectors having positive and negative angles.

The logarithmic function generators referred to hereinbefore may be distributed function generators of the type described in U.S. Pat. No. 3,252,006, or any other suitable type. When a semi-conductor device, such as a distributed function generator, is used as a logarithmic function generator, thermal feedback may be used as a calibration means. Referring now to FIG. 3, a circuit exemplary of thermal feedback is shown wherein a calibration voltage source 28 (CAL) provides a calibration voltage to the input of a logarithmic function generator 30. The calibration voltage is selected to cause the function generator 30 to provide, when properly calibrated, an error voltage of zero volts. The output of the function generator 30 is connected to the input of an integrator 32 which provides an output voltage proportional to the integral of the error voltage. The output of the integrator 32 is connected to a heater 34 which may be an integral part of the function generator 30. The heater 34 causes temperature changes of the function generator 30 in accordance with the output of the integrator 32. The temperature changes alter the transfer characteristics of the function generator 30 in a manner tending to reduce the error voltage to zero, thereby calibrating the function generator 30.

In the preferred embodiment of the present invention, the input of the function generator is cyclically switched from a voltage representative of the horizontal component ($Vh$), to a voltage representative of the sum of the absolute values of the components ($Vh + |Vv|$) and then to the calibration voltage. Cyclic switching of this type is known in the art as multiplexing. In synchronism with the multiplexing, the output of the function generator is cyclically switched to provide voltages respectively proportional to the terms $\ln Vh$ and $\ln(Vh + |Vv|)$, to a pair of storage circuits. At times that the multiplex switch provides the calibration voltage to the input of the function generator, the output of the function generator is connected to an integrator which provides a voltage to a heater as described hereinbefore. The cyclical switching of the output of the function generator is known in the art as de-multiplexing. The multiplexing and de-multiplexing described hereinbefore achieves time sharing of a single function generator, varying the circuit configuration (required for providing voltages proportional to angles of vectors which are either positive or negative), and calibrating the function generator.

Referring now to FIG. 4, in a preferred embodiment of the present invention a multiplex switch 36 has an output terminal 38 connected to the input of the function generator 30 through a signal line 40a. The switch 36 is of a well-known type that is available as a solid-state integrated component (for example, Fairchild No. 3705); it is equivalent to a mechanical switch wherein a movable selection element is selectively connected to one of a plurality of terminals. The switch 36 includes a plurality of selectable input terminals 41–46. When the angle of the vector is positive ($Vv$ being of positive polarity), multiplex terminals 41–43 are cyclically connected to the terminal 38 through a switch path 48. When the angle of the vector is negative ($Vv$ being of negative polarity), multiplex terminals 44–46 are cyclically connected to the terminal 38.

A de-multiplex switch 50, connected by a line 40 to the function generator 30 and similar to the switch 36, has a plurality of output terminals 51–56, a selected one of which is connected to an input terminal 58 via a switch path 59 when the corresponding one of the input terminals 41–46 is connected to the terminal 38. The respective connection of the terminals 41–46, 51–56 to the terminals 38, 58 is controlled by a logic control unit 62, as described hereinafter with respect to FIG. 7. The voltage proportional to the vertical component is provided to the input of the control unit 62 from the terminal 16 through a signal line 64. Identical control signals are provided by the control unit 62 to the switches 36, 50 through signal lines 66. Because identical signals are provided on the lines 66, a voltage proportional to an upward component causes the cyclical connection of the terminal 38 to the input terminals 41–43 simultaneously with the cyclical connection of the terminal 58 to the output terminals 51–53, respectively. Similarly, a voltage proportional to a downward component causes cyclical connection of the terminal 38 to the input terminals 44–46 simultaneously with the cyclical connection of the terminal 58 to the output terminals 51–53, respectively.

The terminal 10 is connected to the input terminals 41, 44 and to positive inputs of the amplifiers 12 and 24 through a signal line 68. the other input of the amplifier 12 and the negative input of the amplifier 24 are connected to the terminal 16 through the signal line 64. When a vector has an upward vertical component and the terminal 38 is connected to the input terminal 41 (so the terminal 58 is also connected to the output terminal 51), the voltage proportional to the horizontal component is provided from the terminal 10 to the input of the function generator 30 through the switch 36. The de-multiplex terminal 51 is connected to the input of a hold circuit 70 through a signal line 71. Therefore, a voltage proportional to the term ln V$h$ is provided by the output of the function generator 30 to the input of the hold circuit 70. A first stored voltage, equal to the voltage provided at the input of the hold circuit 70, is provided at the output thereof continually until a different input voltage is provided thereto by the function generator 30. The hold circuit 70 is well known in the art and described more fully hereinafter. The output of the hold circuit 70 is connected to the negative input of the amplifier 22. Therefore, as in the circuit illustrated in FIG. 1, a voltage proportional to the term ln V$h$ is provided to the negative input of the amplifier 22.

In the cyclical connection of the switches 36, 50, after the terminals 38, 58 are respectively connected to the input terminal 41 and the output terminal 51, they are next respectively connected to the input terminal 42 and the output terminal 52. The input terminal 42 is connected to the output of the amplifier 12. A voltage proportional to the term V$h$ + V$v$ is provided by the amplifier 12 to the input of the function generator 30 through the switch 36. The output terminal 52 is connected to the input of a hold circuit 72 (similar to the hold circuit 70) through a signal line 73. Therefore, a voltage proportional to the term ln (V$h$ + V$v$) is provided by the output of the function generator 30 to the input of the hold circuit 72. A second stored voltage equal to the voltage provided at the input of the hold circuit 72, is provided at the output thereof continually until a different input voltage is provided thereto by the function generator 30. The output of the hold circuit 72 is connected to the positive input of the amplifier 22. Therefore, as in the circuit illustrated in FIG. 1, a voltage proportional to the term ln (V$h$ + V$v$) is provided to the positive input of the amplifier 22. Since both inputs of the amplifier 22 have voltages applied thereto which are the same as those applied in the circuit illustrated in FIG. 1, the output of the amplifier 22 provides a voltage proportional to the angle of the vector in accordance with the transformation relationship.

After the terminals 38, 58 are repsectively connected to the input terminal 42 and the output terminal 52, they are next respectively connected to the input terminal 43 and the output terminal 53. The calibration voltage is provided by the source 28 to the input of the function generator 30 through a signal line 74 and the switch 36 The input of the integrator 32 is connected through the line 33, the terminals 52 and 58, and the line 60 to the output of the function generator 30. The output of the integrator 32 is connected to the heater 34. The connection of the source 28, the function generator 30 and the integrator 32 is the same as the configuration illustrated in FIG. 3; therefore, when the terminals 38, 58 are respectively connected to the input terminal 43 and the output terminal 53, the function generator is thermally calibrated.

When the vector has a downward vertical component, the terminal 38 is connected to the input terminal 44 (and the terminal 58 is also connected to the output terminal 54) and the voltage proportional to the horizontal component is provided to the function generator 30 through the switch 36. The output terminal 54 is connected to the input of the hold circuit 72 through the signal line 73. Therefore, a voltage proportional to the term ln V$h$ is provided by the output of the function generator 30 to the input of the hold circuit 72. The second stored voltage is thereby continually provided to the positive input of the amplifier 22. Therefore, as illustrated in FIG. 2, a voltage proportional to the term ln V$h$ is provided to the positive input of the amplifier 22.

The terminals 38, 58 are next connected to the input terminal 45 and the output terminal 55, respectively. The input terminal 45 is connected to the output of the amplifier 24. A voltage proportional to the term V$h$ − V$v$ is provided by the amplifier 24 to the input of the function generator 30 through the switch 36. The output terminal 55 is connected to the input of the hold circuit 70 through the line 71. Therefore, a voltage proportional to the term ln V$h$ − V$v$ is provided by the output of the function generator 30 to the input of the hold circuit 70. Hence, as in the circuit illustrated in FIG. 2, a voltage proportional to the term ln (V$h$ − V$v$) is provided to the negative input of the amplifier 22. Since both inputs of the amplifiers 22 have voltages applied thereto which are the same as those applied in the circuit illustrated in FIG. 2, the output of the amplifier 22 provides a voltage proportional to the angle of the vector in accordance with the transformation relationship.

After the terminals 38, 58 are respectively connected to the input terminal 45 and the output terminal 55, they are next respectively connected to the input terminal 46 and an output terminal 56. The calibration voltage is provided by the source 28 to the input of the function generator 30 through the signal line 74 and the switch 36. The output of the integrator 32 is connected to the terminal 56 through the signal lines 33. Therefore, the source 28, the function generator 30 and integrator 32 are in the same configuration as illustrated in FIG. 3. Hence, when the terminals 38, 50 are respectively connected to the input terminal 43 and the output terminal 53, the function generator is calibrated.

The hold circuit 70, of a type well known in the art, is comprised of an operational amplifier 75 which has its output connected to its inverting input 76. A capacitor 77 is connected from the noninverting input 78 to ground. The non-inverting input 78 is the input to the hold circuit 70 and is connected to the line 71. The connection of the amplifier 74 is in the well known source follower configuration. Source followers have a very high input impedance, a low output impedance and a voltage gain of unity. Therefore, a voltage applied to the capacitor 78 through the line 71 charges the capacitor to the applied voltage. Thereafter, when a voltage is not applied through the line 71, the charge on the capacitor 78 is held because only a high impedance discharge path through the noninverting input 77 is available. Because the source follower has a gain of unity, the output voltage of the amplifier 74 is equal to the voltage held by the capacitor 78.

As stated hereinbefore, a deviation exists between the angle provided by the transformation relationship and the actual angle of the vector. A curve of the deviation by the transformation relationship is provided in FIG. 5. A nonlinear network 80 (FIG. 4) may be used to provide a correction voltage which, when subtracted from the output voltage of the amplifier 72, substantially eliminates the deviation associated with the transformation relationship. Accordingly, the nonlinear network 80 has its input connected to the output of the amplifier 22. The output of the network 80, which provides the correction voltage, and the output of the amplifier 72 are respectively connected to the inputs of a difference amplifier 82 which provides a voltage proportional to the difference of the inputs thereof.

Referring now to FIG. 6, a well-known nonlinear network suitable for use in the preferred embodiment is comprised of an operational amplifier 84 with the noninverting input thereof grounded (causing substantially ground potential at the inverting input). A first input section is comprised of resistors 88, 90, 92 and a diode 94. A second input section is comprised of resistors 96, 98 and 100 equal to the resistors 90, 92 and 88 respectively, and a diode 102. The resistors 90, 92 are connected in series from an input terminal 104 to the inverting input of the amplifier 84. The resistor 88 is connected from a positive voltage source 106 which provides a positive voltage (V) to the junction of the resistors 90, 92; the diode 94 has its anode connected to the junction of the resistors 90, 92 and its cathode connected to ground.

The resistors 96, 98 are connected in series from the input terminal 104 to the inverting input of the amplifier 84. The resistor 100 is connected between a voltage source 108 which provides a negative voltage (−V) and the junction of the resistors 96, 98; the diode 102 has its cathode connected to the junction of the resistors 96, 98 and its anode connected to ground. As is well known in the art, for the amplifier 84 to provide a non-zero output voltage, current must be provided either through the resistor 92 or the resistor 98 in response to an input voltage provided at the terminal 104. When low input voltages are applied to the terminal 104, current provided by the source 106 through the resistor 88 flows through the forward biased diode 94. Similarly, current into the source 108 flows through the resistor 100 and the forward biased diode 102. Since the forward biasing of the diodes 94, 102 causes substantially ground potential on the anode and cathode respectively, current is not provided through the resistors 92, 98. A positive voltage applied at the terminal 104 which causes a current through the resistor 96 which is greater than the current through the resistor 100 causes a current through the resistor 98 towards the inverting input. Similarly a negative voltage which causes a current through the resistor 90 greater than the current in the resistor 88 causes a current in the resistor 92 away from the noninverting input. Therefore, the nonlinear network provides a zero correction voltage at low input voltages (vectors having small angles where there is substantially no approximation error) and provides a correction voltage which may be governed, by appropriate choice of resistor values, to minimize the deviation when input voltages are higher (vectors having large angles where the deviation may be appreciable).

Referring now to FIG. 7, the multiplex control logic circuit 62 includes a comparator 110 which may simply comprise a differencing amplifier to provide a signal on a line 66a whenever the vertical component of velocity ($Vv$) is positive indicating a positive angle. The signal on the line 66a comprises the most significant bit of three bits (including those on signal lines 66b and 66c) which control the multiplex switches 36, 50 in a well known fashion so as to determine the connections made therein. The lower ordered bits represented by signals on lines 66b and 66c are provided by a counter 112 which is driven by an oscillator 114, which may have a period on the order of 120 microseconds, if desired, or any other suitable period. Thus whenever the ange is positive, a signal will be present on line 66a and the signals will vary on lines 66b and 66c at the repetition rate of the oscillator 114 so as to cause cycling between input terminals 41–43 and output terminals 51–53; similarly, when the angle is negative, there will be no signal on the line 66a so that the lower ordered signals on the lines 66b and 66c will cause cycling between the input terminals 44–46 and cycling between the output terminals 54–56. The multiplex switches 36, 50 if of the aforementioned Fairchild type, may have other inputs to control them, but these form no part of the present invention and may be provided for in accordance with well known teachings of the prior art.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for providing output signals substantially representative of the angle of a vector having first and second orthogonal components, said apparatus being responsive to a first signal having an absolute value proportional to said first orthogonal component and a second signal having a value proportional to said second orthogonal component, comprising:

input means for receiving said first and second signals; means connected to said input means and concurrently responsive to said first and second signals for providing a third signal proportional to the sum of the absolute values of said orthogonal components; and circuit means responsive to said first and third signals for providing an output signal proportional to the difference of the logarithms of said first and third signals.

2. Apparatus according to claim 1 additionally comprising: means connected for response to said output signal for providing a correction signal; and means for providing a corrected output signal proportional to the difference in the values of said output signal and said correction signal whereby said corrected output signal is proportional to the angle of the vector, the deviation of said corrected output signal thereby being substantially reduced.

3. Apparatus according to claim 2 wherein said means for providing a correction signal comprises a nonlinear network.

4. Apparatus according to claim 1 wherein said circuit means comprises:

a source of timing signals;

a distributed function generator for providing a logarithm signal proportional to the logarithm of a signal applied to the input thereof;

switching means connected for response to said timing signals for alternately applying said first and third signals to the input of said distributed function generator and responsive to the output thereof to alternately provide respective logarithm signals proportional to the logarithms of the values represented by said first and third signals;

first and second storage means responsive to said switching means for storing said respective logarithm signals; and subtraction means responsive to said storage means for providing an output signal proportional to the difference of the values represented by the respective logarithm signals stored therein.

5. Apparatus according to claim 4 wherein said switching means includes means causing said first and second storage means to respectively store logarithm signals relating to said first and third signals in response to said second signal having a negative sign, and respectively store logarithm signals relating to third and first signals in response to said second signal having a positive sign, said subtraction means providing a signal proportional to the value of the signal stored by said first storage means subtracted from the value of the signal stored by said second storage means, whereby the polarity of said output signal is the same as the sign of said second signal.

6. Apparatus according to claim 4 additionally comprising:

means for heating said function generator;

a calibration signal source connected to said switching means;

an integrator connected to said switching means, the output of said integrator being connected to said heating means; and said switching means including means periodically connecting said calibration signal source to the input of said function generator and connecting the output of said function generator to said integrator, said function generator thereby periodically providing an error voltage to said integrator.

* * * * *